United States Patent
Tunguz-Zawislak et al.

(10) Patent No.: US 8,942,993 B2
(45) Date of Patent: Jan. 27, 2015

(54) PROFILE ADVERTISEMENTS

(75) Inventors: Tomasz J. Tunguz-Zawislak, San Francisco, CA (US); Shannon P. Bauman, Chapel Hill, NC (US)

(73) Assignee: Google Inc., Mountain View, CA (US)

( * ) Notice: Subject to any disclaimer, the term of this patent is extended or adjusted under 35 U.S.C. 154(b) by 77 days.

(21) Appl. No.: 13/176,472

(22) Filed: Jul. 5, 2011

(65) Prior Publication Data

US 2011/0264533 A1   Oct. 27, 2011

Related U.S. Application Data

(63) Continuation of application No. 11/479,253, filed on Jun. 30, 2006, now abandoned.

(51) Int. Cl.
*G06Q 30/00* (2012.01)

(52) U.S. Cl.
USPC ............... 705/14.66; 705/319; 705/14.67; 705/14.49; 705/14.4

(58) Field of Classification Search
USPC ............. 705/14.66, 319, 14.67, 14.49, 14.4
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman et al. | |
| 6,026,368 A | 2/2000 | Brown et al. | |
| 6,044,376 A | 3/2000 | Kurtzman | |
| 6,078,914 A | 6/2000 | Redfern | |
| 6,144,944 A | 11/2000 | Kurtzman et al. | |
| 6,167,382 A | 12/2000 | Sparks et al. | |
| 6,269,361 B1 | 7/2001 | Davis et al. | |
| 6,285,999 B1* | 9/2001 | Page | 1/1 |
| 6,401,075 B1 | 6/2002 | Mason et al. | |
| 6,577,716 B1 | 6/2003 | Minter et al. | |

(Continued)

FOREIGN PATENT DOCUMENTS

WO    WO9721183 A1    6/1997

OTHER PUBLICATIONS

Park et al., "Majority based ranking approach in web image retrieval", Lecture Notes in Computer Science, vol. 27-28, pp. 499-504, 2003.

(Continued)

*Primary Examiner* — Luis A Brown
(74) *Attorney, Agent, or Firm* — Fish & Richardson P.C.

(57) ABSTRACT

In one aspect, this application describes a method for determining personal advertisements for display with personal content in an online social network. The method includes obtaining personal content for a first member of an online social network, and obtaining information that characterizes a personal advertisement that advertises a second member of the online social network. The method also includes comparing the personal content for the first member to the information that characterizes the personal advertisement to determine whether the personal advertisement is related to the personal content for the first member, without determining whether the first member is related to the second member in the online social network. The method also includes providing the personal advertisement for display with the document for the first member in response to determining that the information that characterizes the personal advertisement is related to the personal content for the first member.

20 Claims, 9 Drawing Sheets

(56) References Cited

U.S. PATENT DOCUMENTS

| | | | |
|---|---|---|---|
| 6,985,882 B1 | 1/2006 | Del Sesto | |
| 7,039,599 B2 | 5/2006 | Merriman et al. | |
| 7,120,668 B2* | 10/2006 | Manber et al. | 709/205 |
| 7,136,875 B2 | 11/2006 | Anderson et al. | |
| 7,188,153 B2* | 3/2007 | Lunt et al. | 709/218 |
| 7,197,544 B2* | 3/2007 | Wang et al. | 709/219 |
| 7,310,516 B1 | 12/2007 | Vacanti et al. | |
| 7,478,078 B2* | 1/2009 | Lunt et al. | 1/1 |
| 7,904,337 B2* | 3/2011 | Morsa | 705/14.71 |
| 2002/0023230 A1 | 2/2002 | Bolnick et al. | |
| 2002/0120506 A1 | 8/2002 | Hagen | |
| 2002/0123928 A1 | 9/2002 | Eldering et al. | |
| 2004/0059708 A1* | 3/2004 | Dean et al. | 707/1 |
| 2004/0093327 A1* | 5/2004 | Anderson et al. | 707/3 |
| 2004/0122803 A1 | 6/2004 | Dom et al. | |
| 2004/0143841 A1 | 7/2004 | Wang et al. | |
| 2004/0148275 A1* | 7/2004 | Achlioptas | 707/3 |
| 2004/0215793 A1 | 10/2004 | Ryan et al. | |
| 2005/0091202 A1 | 4/2005 | Thomas | |
| 2005/0144065 A1 | 6/2005 | Calabria et al. | |
| 2005/0149395 A1 | 7/2005 | Henkin et al. | |
| 2005/0159970 A1* | 7/2005 | Buyukkokten et al. | 705/1 |
| 2005/0171799 A1 | 8/2005 | Hull et al. | |
| 2005/0171832 A1* | 8/2005 | Hull et al. | 705/10 |
| 2005/0177385 A1 | 8/2005 | Hull et al. | |
| 2005/0216300 A1 | 9/2005 | Appelman et al. | |
| 2005/0235062 A1* | 10/2005 | Lunt et al. | 709/225 |
| 2005/0278443 A1* | 12/2005 | Winner et al. | 709/224 |
| 2005/0289113 A1* | 12/2005 | Bookstaff | 707/1 |
| 2006/0004914 A1 | 1/2006 | Kelly et al. | |
| 2006/0026013 A1 | 2/2006 | Kraft | |
| 2006/0031121 A1 | 2/2006 | Speicher | |
| 2006/0041543 A1* | 2/2006 | Achlioptas | 707/3 |
| 2006/0080613 A1* | 4/2006 | Savant | 715/745 |
| 2006/0085253 A1 | 4/2006 | Mengerink et al. | |
| 2006/0115904 A1 | 6/2006 | Cai | |
| 2006/0135264 A1 | 6/2006 | Shaw et al. | |
| 2006/0200435 A1 | 9/2006 | Flinn et al. | |
| 2006/0218577 A1 | 9/2006 | Goodman et al. | |
| 2006/0271460 A1 | 11/2006 | Hanif | |
| 2007/0043688 A1 | 2/2007 | Kountz et al. | |
| 2007/0061195 A1* | 3/2007 | Liu et al. | 705/14 |
| 2007/0121843 A1* | 5/2007 | Atazky et al. | 379/114.13 |
| 2007/0136136 A1 | 6/2007 | Nossik | |
| 2007/0143376 A1 | 6/2007 | McIntosh | |
| 2007/0150537 A1* | 6/2007 | Graham | 709/203 |
| 2007/0156636 A1* | 7/2007 | Norton et al. | 707/1 |
| 2007/0157119 A1* | 7/2007 | Bishop | 715/810 |
| 2007/0198510 A1* | 8/2007 | Ebanks | 707/5 |
| 2007/0214121 A1* | 9/2007 | Ebanks | 707/3 |
| 2007/0233857 A1 | 10/2007 | Cheng et al. | |
| 2007/0234213 A1 | 10/2007 | Krikorian et al. | |
| 2007/0250483 A1* | 10/2007 | Blue et al. | 707/3 |
| 2008/0005072 A1* | 1/2008 | Meek et al. | 707/3 |
| 2008/0005073 A1* | 1/2008 | Meek et al. | 707/3 |
| 2008/0005282 A1* | 1/2008 | Gaedcke | 709/219 |
| 2008/0052742 A1 | 2/2008 | Kopf et al. | |
| 2008/0270551 A1* | 10/2008 | Flake et al. | 709/206 |
| 2008/0301746 A1 | 12/2008 | Wiser et al. | |
| 2009/0106368 A1 | 4/2009 | Padveen et al. | |
| 2009/0131025 A1 | 5/2009 | Sharma et al. | |

OTHER PUBLICATIONS

Pentland et al., "Content-based manipulation of image databases", International Journal of Computer Vision (IJCV), vol. 18, No. 3, pp. 233-254, 1996.

Philbin et al., "Object retrieval with large vocabularies and fast spatial matching", in Proc. Conference on Computer Vision and Pattern Recognition (CVPR), 2007, 8 pages.

Pilaszy "Text Categorization and Support Vector Machines" Computer Science, vol. 1398, (1998) 10 pages.

R. Datta et al., "Image retrieval: Ideas, influences, and trends of the new age", ACM Computing Surveys, vol. 40. No. 2, 2008, 60 pages.

Request for Reexamination of U.S. Patent No. 6,446,045 B1, Control No. 95/001,061, 54 pages.

Request for Reexamination of U.S. Patent No. 6,829,587 B2, Control No. 95/001,068, 85 pages.

Request for Reexamination of U.S. Patent No. 7,240,025 B2, Control No. 95/001,073, 85 pages.

Request for Reexamination of U.S. Patent No. 7,249,059 B2, Control No. 95/001,069, 81 pages IDSx 58 IDS 3/18/11x.

Schindler et al., "City-scale location recognition", in Proc. Conference on Computer Vision and Pattern Recognition (CVPR), 2007, 7 pages.

Sebastiani "Machine Learning in Automated Text Categorization" ACM Computing Surveys, vol. 34, No. I, Mar. 2002, pp. 1-47.

Simon et al., "Scene summarization for online image collections", in Proc. 12th International Conference on Computer Vision (ICCV), 2007, 8 pages.

Uchihashi et al., "Content-free image retrieval by combinations of keywords and user feedbacks", in Proc. 5th International Conference on Image and Video Retrieval (CIVR), pp. 650-659, 2005.

Weinberger et al., "Distance metric learning for large margin nearest neighbor classification", in Proc. 18th Conference on Advances in Neural Information Processing Systems (NIPS), vol. 18, pp. 1437-1480, 2006.

Winder et al., "Learning local image descriptors", in Prof. Conference on Computer Vision and Pattern Recognition (CVPR), 2007, 8 pages.

Zeff, R. et al., Advertising on the Internet, 2nd Ed., John Wiley & Sons, 1999, 440 pages.

"A Comparative Study on Feature selection and Classification methods Using Gene Expression Profiles and Proteomic Patterns" by Liu et al., for Genome Informatics 13:, pp. 51-60, 2002.

AdForce, Inc., A Complete Guide to AdForce, Version 2.6, 1998, 285 pages.

AdForce, Inc., S-1/A SEC Filing, May 6, 1999, 9 pages.

AdKnowledge Campaign Manager: Reviewer's Guide, AdKnowledge, Aug. 1998, 23, pages.

AdKnowledge Market Match Planner: Reviewer's Guide, AdKnowledge, May 1998, 26 pages IDSx IDS 3/18/11x.

Ad-Star.com website archive from www. Archive.org, Apr. 12, 1997 and Feb. 1, 1997, 43 pages.

Baluja et al., ideo suggestion and discover for YouTube: Taking random walks through the view graph:, in Proc. 17th International World Wide Web Conference (WWW), 2008, 10 pages.

Baseview Products, Inc., AdManagerPro Administration Manual v. 2.0, Dec. 1998, 226 pages.

Baseview Products, Inc., ClassManagerPro Administration Manual v. 1.0.5, Feb. 1, 1997,157 pages.

Bay et al., "Surf: Speeded up robust features", in Proc. 9th International European Conference on Computer Vision (ECCV), pp. 404-417, 2006.

Belongie et al, "Shape matching and object recognition using shape contexts", IEEE Transactions on Pattern Analysis and Machine Intelligence (TPAMI), vol. 24, No. 24, pp. 509-522, 2002.

Brin, et al. "The Anatomy of a Large-Scale Hypertextual Web Search Engine" Computer Networks (1998) p. 1-26.

Business Wire, "Global Network, Inc. Enters Into Agreement in Principle With Major Advertising Agency," Oct. 4, 1999, 2 pages.

Carson et al., "Blob-world: image segmentation using expectation-maximization and its application to image querying", IEEE transactions on Pattern Analysis and Machine Intelligence (TPAMI), vol. 24, No. 8, pp. 1026-1038, 2002.

Chakrabarti, et al. "Mining the Web's Link Structure" IEEE Computer Magazine (Aug. 1999) pp. 60-67.

Smeulders et al., "Content-based image retrieval at the end of the early years", IEEE Transactions on Pattern Analysis and Machine Intelligence (TPAMI), vol. 22, No. 12, pp. 1349-1380, 2000.

Xing et al., "Distance metric learning, with applications to clustering with side-information", in Proc. 15th Conference on Advances in Neural Information Processing Systems (NIPS), vol. 15, pp. 450-459, 2002.

D.G. Lowe, "Distinctive Image Features from Scale-Invariant Keypoints", International Journal of Computer Vision (IJCV), vol. 60, No. 2, pp. 91-110, 2004.

(56) References Cited

OTHER PUBLICATIONS

Datar et al., Locality-sensitive hashing scheme based on p-stable distributions:, in Proc. 20th Symposium on Computational Geometry (SCG), pp. 253-262, 2004.
Dedrick, R., A Consumption Model for Targeted Electronic Advertising, Intel Architecture Labs, IEEE, 1995, 9 pages.
Dedrick, R., Interactive Electronic Advertising, IEEE, 1994, 12 pages.
Facebook unveils school-specific advertisements' [online]. The Stanford Daily, 2005, 2005, [retrieved on Jun. 14, 2006]. Retrieved from the Internet: <URL: www.daily.stanford.edu/tempo?page=content&id=15553&repository=0001_article>, 2 pages.
Fergus et al., "A visual category filter for Google images," in Proc. 8th European Conference on Computer Vision (ECCV), pp. 242-256, 2004.
Fergus et al., "Object class recognition by unsupervised scale-invarint learning" in Proc. Conference on Computer Vision and Pattern Recognition (CVPR), vol. 2, pp. 264-271, 2003.
Frey et al., "clustering by passing messages between data points", Science, vol. 315, pp. 972-976, 2007.
Friedman et al., Bayesian network classifiers Machine Learning, vol. 29, pp. 131-163, 1997.
Frome et al., "Learning globally-consistent local distance functions for shape-based image retrieval and classification", in Proc. 11th IEEE International Conference on Computer Vision (ICCV), pp. 1-8, 2007.
Harris et al., "A combine corner and edge detector", in Proc. 4th Alvey Vision Conference, pp. 147-151, 1988.
Haveliwala, et al. "Topic-Sensitive Page Rank" IEEE Transactions on Knowledge and Data Engineering (2003) 10 pages.
He et al., "Imagerank: spectral techniques for structural analysis of image database", in Proc. International Conference on Multimedia and Expo, vol. 1, pp. 25-28, 2002.
Herlocker, et al. "Evaluating Collaborative Filtering Reeommender Systems" ACM Transactions on Information Systems, vol. 22, No. 1, Jan. 2004, pp. 5-53.
Hsu et al., "Video search reranking through random walk over document-level context graph" in Proc. 15th International Conference on Multimedia, pp. 971-980, 2007.
Indyk et al., "Approximate nearest neighbor-towards removing the curse of dimensionality", in Proc. 30th ACM Symp. on Computational Theory, pp. 604-613, 1998.
Information Access Technologies, Inc., Aaddzz brochure, "The Best Way to Buy and Sell Web Advertising Space," © 1997, 6 pages.
Information Access Technologies, Inc., Aaddzz.com website archive from www. Archive.org, archived on Jan. 30, 1998, 42 pages.
J.M. Kleinberg, "Authoritative sources in a hyperlinked environment", Journal of the ACM, vol. 46, No. 5, 1999, 34 pages.
Jing et al., "Canonical image selection from the web", in Proc. 6th International Conference on Image and Video Retrieval (CIVR), pp. 280-287, 2007.
Jing et al., "VisualRank: Applying PageRank to Large-Scale Image Search, 14 pages".
Joshi et al., "The story picturing engine—a system for automatic text illustration", ACM Transactions on Multimedia, Computing, Communications and Applications, vol. 2, No. 1, pp. 68-89, 2006.
Ke et al., "Efficient near-duplicate detection and sub-image retrieval", in Proc. ACM International Conference on Multimedia (ACM MM), pp. 869-876, 2004.
Ke et al., "Pca-sift: A more distinctive representation for local image descriptors", in Proc. Conference on Computer Vision and Pattern Recognition (DCPR), vol. 2, pp. 506-516, 2004.
Kleinberg, et al. "The Web as a graph: measurements, models, and methods" Proceedings of the International Conference on Combinatorics (1999) 18 pages.
Kondor et al., "Diffusion kernels on graphs and other discrete structures", in Proc. 19th International Conference on Machine Learning (ICML), pp. 315-322, 2002.
Konstan, et al. "Applying Collaborative Filtering to Usenet News" Communications of the ACM, Mar. 1997, vol. 40, No. 3, pp. 77-87.
Lazebnik et al., A sparse texture representation using affine-invariant regions, in Proc. Conference on Computer Vision and Pattern Recognition (CVPR), vol. 2, pp. 319-324, 2003.
Ma et al., "A toolbox for navigating large image databases", Multimedia System, vol. 3, No. 7, pp. 568-571, 1999.
Mikolajczyk et al., "A performance evaluation of local descriptors", IEEE Transactions on Pattern Analysis and Machine Intelligence (TPAMI), vol. 27, No. 10, pp. 1615-1630, 2005.
Nister et al., "Scalable recognition with a vocabulary tree", in Proc. Conference on Computer vision and Pattern Recognition (CVPR), vol. 2, pp. 2161-2168, 2006.
Nowak et al., "Learning visual similarity measures for comparing never seen objects", in Proc. Conference on Computer Vision and Pattern Recognition (CVPR), 2007, 8 pages.
P. Indyk, "Stable distributions, pseudorandom generators, embeddings, and data stream computation", in Proc. 41st IEEE Symposium on Foundations of Computer Science (FOCS), 2000, 17 pages.

* cited by examiner

PROFILE ADVERTISEMENTS

CROSS-REFERENCE TO RELATED APPLICATION

This application claims priority to U.S. application Ser. No. 11/479,253, filed on Jun. 30, 2006, entitled "Profile Advertisements," the entire contents of which are hereby incorporated by reference.

TECHNICAL FIELD

This instant specification relates to systems and methods for advertising online profiles.

BACKGROUND

As the Internet has become increasingly popular, online social networks are becoming an important and pervasive mechanism for communication, entertainment, and profession and social networking. Some online social networks use digital advertisements to meet or defray the costs of hosting. Some of the advertisements, however, are directed to commercial products, which may not be of interest to many people using an online social network for the purposes described above.

Some other online social networking systems may proactively highlight new or popular members of the systems. However, the highlighted members may have little in common with other users of the social network system that view these highlights. To find members with similar interests, users may have to perform searches using a search feature of the online social network system. However, the search results may be dependent on the accuracy of the search terms entered by the user. Additionally, the search mechanism may not provide members with an opportunity to make their profiles more prominent in the search result.

Also, the ability of the members to highlight themselves may be limited by the proactive nature of the searching because a user may have to purposely initiate a search for other members before members with similar interests are highlighted for the user.

SUMMARY

In general, this document describes advertisements associated with particular persons or groups (e.g., bands, clubs, and the like). In one example, a system may generate on-line personal advertisements, such as for members of a social network, and may track responses to such advertisements.

The systems and techniques described here may provide one or more of the following advantages. First, a system can provide members (which may include individuals or identifiable groups) of an online social network a proactive method to highlight themselves. Second, a system can generate advertisements that are more relevant to members of a social network. This may increase the profitability of entities hosting the social network by generating a revenue source from the members and increasing the click through rates for the generated advertisements. Third, a system may provide members of one social network with information about people that have similar characteristics but are members of a different social network.

In one implementation, a computer-implemented method for determining personal advertisements for display with personal content in an online social network is described. The method includes obtaining, using a computer system, personal content for a first member of an online social network, the personal content corresponding to content included in a document for the first member on the online social network. The method also includes obtaining, using the computer system, information that characterizes a personal advertisement that advertises a second member of the online social network. The method also includes comparing, using the computer system, the personal content for the first member to the information that characterizes the personal advertisement to determine whether at least a portion of the personal advertisement is related to at least a portion of the personal content for the first member, without determining whether the first member is related to the second member in the online social network. The method also includes providing the personal advertisement for display with the document for the first member in response to determining that at least a portion of the information that characterizes the personal advertisement is related to at least a portion of the personal content for the first member, the personal advertisement including a link to a document for the second member on the online social network.

In some aspects, the personal content for the first member may include content that indicates interests of the first member and the personal advertisement may include content that indicates interests of the second member. In some examples, comparing the personal content for the first member to the information that characterizes the personal advertisement may include determining whether at least a portion of the content that indicates interests of the first member matches at least a portion of the content that indicates interests of the second member. The second member may be a group on the online social network.

In other aspects, the method may further include monitoring accesses of the document for the second member on the online social network that occur as a result of the personal advertisement being presented. The method may also include generating a fee that is charged to the second member based on at least one of the accesses, and/or generating a payment that is paid to the first member based on at least one of the accesses, and/or generating a payment that is paid to the online social network based on at least one of the accesses.

In another implementation, a computer-implemented system for providing personal advertisements for display with personal content in an online social network is described. The system includes an electronic document crawler executing on a computer system to obtain personal content for a first member of an online social network, the personal content corresponding to content included in a document for the first member on the online social network. The system also includes a personal advertisement database to store a personal advertisement that advertises a second member of the online social network, the personal advertisement including a link to a document for the second member on the online social network. The system also includes a profile matcher executing on the computer system to compare the personal content for the first member to information that characterizes the personal advertisement to determine whether at least a portion of the personal advertisement is related to at least a portion of the personal content for the first member, without determining whether the first member is related to the second member in the online social network. The system also includes an interface to provide the personal advertisement for display with the document for the first member in response to determining that at least a portion of the information that characterizes the personal advertisement is related to at least a portion of the personal content for the first member.

In some aspects, the personal content for the first member may include content that indicates interests of the first member and the personal advertisement may include content that indicates interests of the second member. In some examples, the profile matcher may compare the personal content for the first member to the information that characterizes the personal advertisement by determining whether at least a portion of the content that indicates interests of the first member matches at least a portion of the content that indicates interests of the second member. In other examples, the interface may monitor accesses of the document for the second member on the online social network that occur as a result of the personal advertisement being presented.

The details of one or more embodiments of the personal profile features are set forth in the accompanying drawings and the description below. Other features and advantages of the personal profile features will be apparent from the description and drawings, and from the claims.

DESCRIPTION OF DRAWINGS

Like reference symbols in the various drawings indicate like elements.

DETAILED DESCRIPTION

Figure 1:
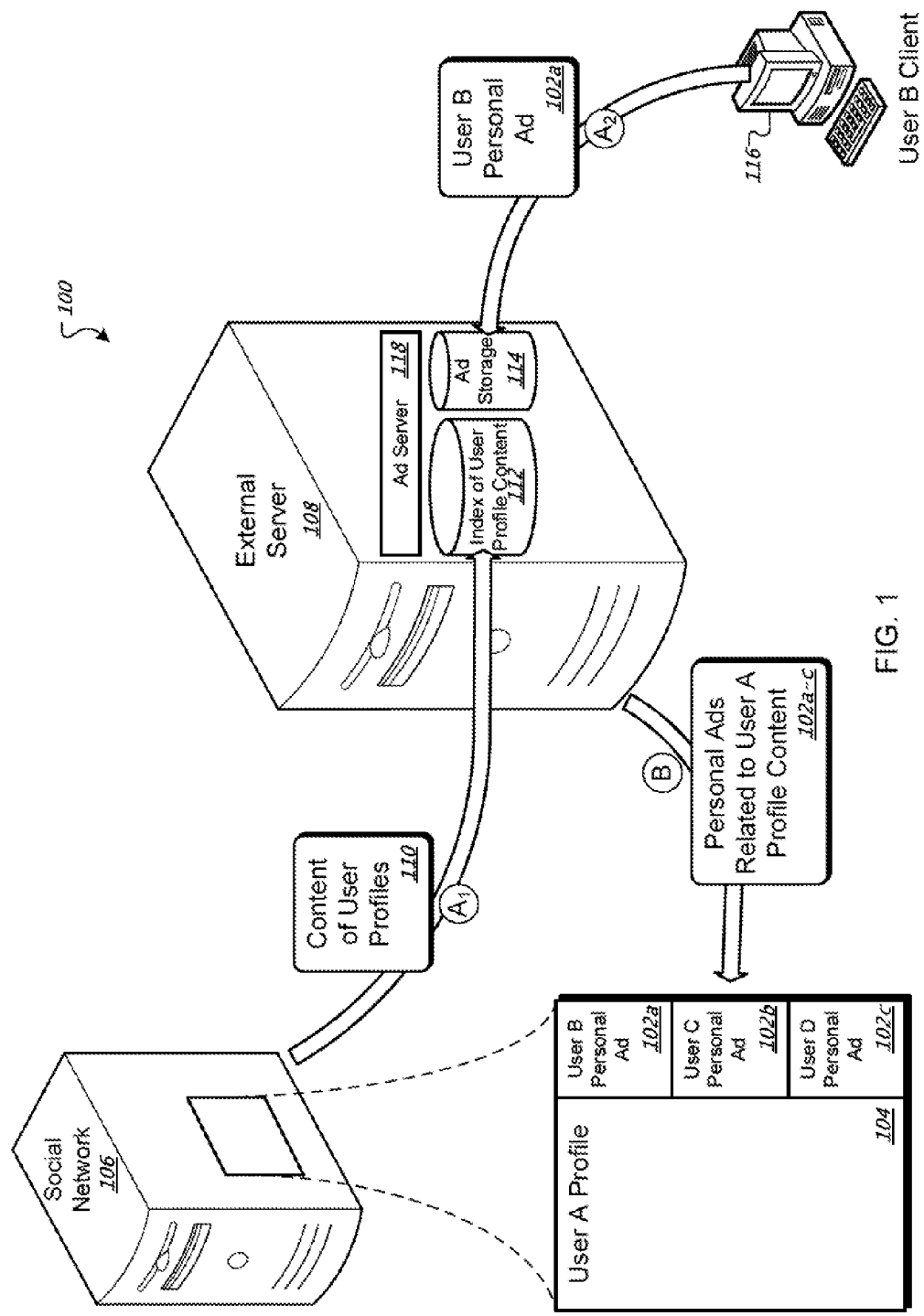
FIG. 1 is a schematic diagram of an example system for presenting advertising content related to a personal web page.

FIG. 1 is a schematic diagram of an example system 100 for presenting advertising content 102*a-c* related to a personal web page 104. The personal web page 104 is, for example, a user profile in an online social network 106, which can include hosted web pages that describes profiles, or characteristics, of the social network's members. Examples of online social networks can include orkut.com, myspace.com, and friendster.com. Alternatively, other types of online social networks or personal web pages may be used, such as job hunting web sites (e.g., monster.com), school alumni web sites, organizations of professionals, Internet dating sites, ratings sites (e.g., hotornot.com), and a company employee internal web site. The personal ads 102*a-c* direct users viewing the personal web page 104 to other personal web pages, such as other social network user profiles or other non-commercial web pages. In certain implementations, the personal ads 102*a-c* are received from a personal advertiser (e.g., someone advertising his or her personal profile or personal web page).

An external server 108 indexes content from user profiles 110 and stores the indexed content in a repository 112. In addition, the external server 108 stores personal ads in a repository 114, such as the user B personal ad 102*a* from a user B client 116. Using the indexed profiles in the repository 112, an ad server 118 determines which of the ads in the repository 114 relate to the user A profile 104 currently presented. The related personal ads 102*a-c* are displayed with the user A profile 104. In certain implementations, the related ads 102*a-c* are transmitted to the social network 106. Alternatively, the related ads 102*a-c* may be transmitted to a client device presenting the user A profile 104. In certain implementations, the components and/or actions attributed here to the external server 108 may be included in and/or performed by the social network 106.

Figure 2:
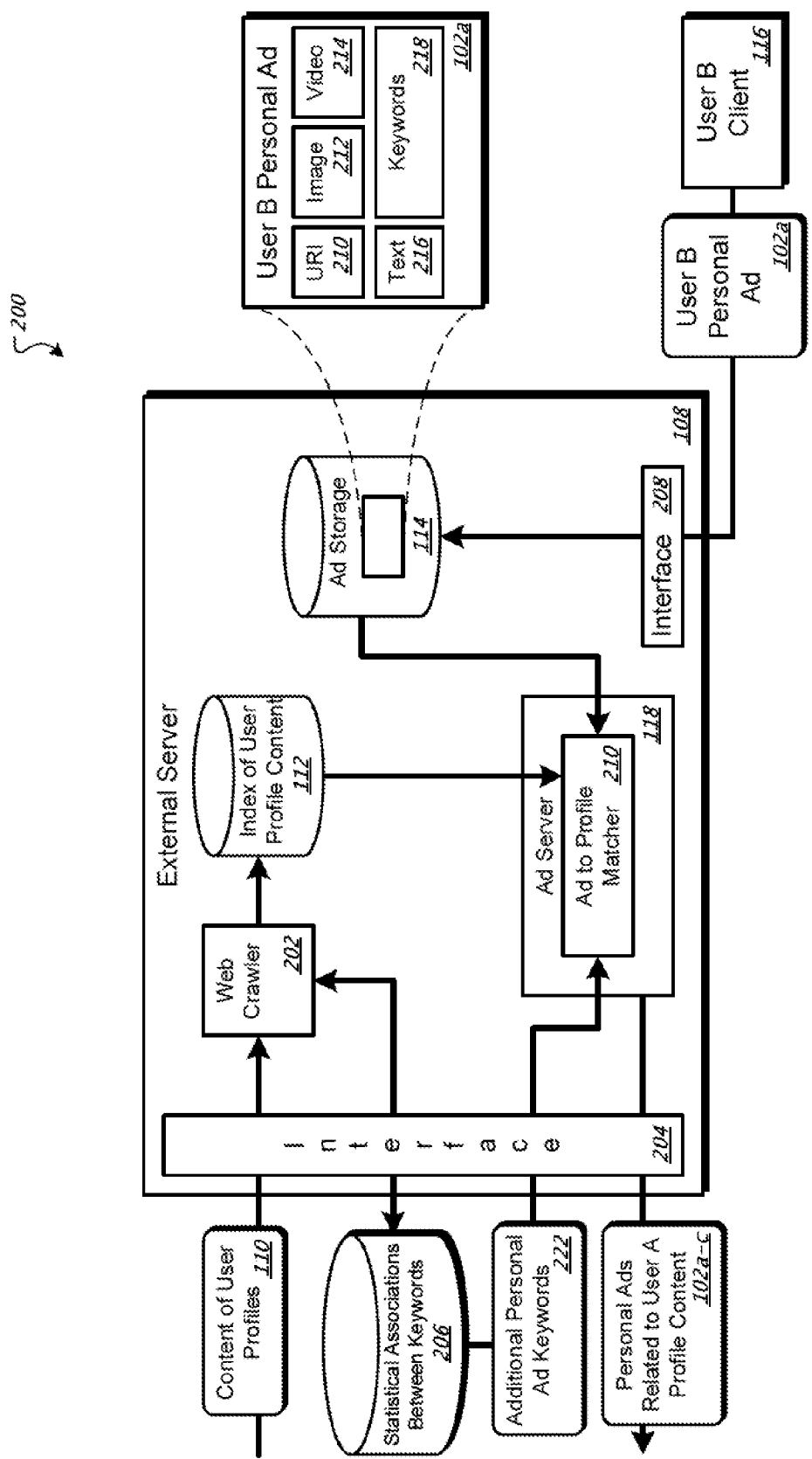
FIG. 2 is a block diagram of an example system for presenting advertising content related to a personal web page.

FIG. 2 is a block diagram of an example system 200 for presenting advertising content 102*a-c* related to a personal web page. The external server 108 includes a web crawler 202. The web crawler 202 receives the user profile content 110 via an interface 204. The web crawler 202 traverses the user profile content 110 and generates the indexed user profile content stored in the repository 112.

In addition, the web crawler 202 can generate statistical associations between keywords and the user profile content 110. For example, the user profile content 110 can contain information used by the web crawler to identify what keyword may be related to the content of the profile. This information can include text within the profile, keywords (e.g., metadata) that describe the profile, frequencies of words occurring in the profile, font size of text in the profile (e.g., if one word has a larger font size, more emphasis can be given when associating the profile with keywords), or a hyperlink structure within the profile. The web crawler 202 can store the statistical associations in a repository 206.

The structure of the profile used in certain social networks also can be integrated into the analysis of appropriate keywords to link to the profile. For example, the profile may be structured so that certain types of content are identified using their location on the page, metadata, and text proceeding the content (e.g., "interests:," "age:," etc.). If the web crawler 202 determines that the text "law" is within the "interest:" content of a first profile, it can record this association so that other advertisements for profiles that include similar interests may appear on the first profile.

The external server 108 receives the user B personal ad 102*a* via an interface 208 and stores the personal ad 102*a* in the repository 114. The personal ad 102*a* includes sub-components, including a uniform resource identifier 210, an image 212, a video 214, text 216, and/or keywords 218. The image 212, video 214, and text 216 can form the information presented to the user viewing the personal ad 102*a*. In addition, the personal ad 102*a* may include audio or other appropriate media.

In certain implementations, the URI 210 is a uniform resource link (URL) that permits a user viewing the personal ad 102*a* to navigate from the user A profile 104 to a personal web page of the user B. In other implementations, the URI 210 can include contact information for the user B (e.g., instant messenger address, telephone number, mailing address, email address, etc.).

In certain implementations, the image 212, video 214, and text 216 are retrieved from the user B personal web page to which the URI 210 directs. For example, a personal advertiser can enter in the URL of the advertiser's profile. The web crawler can retrieve content from the profile based on the profile structure. Because the profile structure is uniform, the web crawler can retrieve consistent content, such as an introductory paragraph that describes the personal advertiser and a photograph of the personal advertiser. In other implementations, the personal advertiser selects the content and uploads it as part of the User B Personal Ad 102*a*.

The keywords 218 describe the personal ad 102*a* and/or the user B personal web page that the personal ad 102*a* advertises. The keywords 218 may describe, for example, a category to which the ad 102*a* or the web page belongs, or a language used by the ad 102*a* or the web page. The personal advertiser can enter the keywords, the external server 108 can generate them using the statistical information in the repository 206, or the keywords can originate from both.

The external server 108 includes an ad to profile matcher 220 within the ad server 118. The ad to profile matcher 220 matches personal ads from the repository 114 to a profile to be presented. The matcher 220 uses the indexed user profile content in the repository 112 together with additional personal ad keywords 222 from the repository 206 to relate, for example, the user A profile 104 to the personal ads 102*a-c*. For example, the user A profile 104 may contain text, keywords, or links to web pages including the phrases "Star Trek," "cycling," and "local music." The personal ads 102*a-c* may contain keywords of "Star Trek" 218, "cycling," and "local music," respectively. The matcher 220 determines that the profile 104 is related to the ad 102*a* by the words "Star Trek," to the ad 102*b* by the word "cycling," and to the ad 102*c* by the words "local music."

Additionally, a phrase associated with the user A profile 104 may originate from the additional personal ad keywords 222. For example, the user A profile 104 may include the phrase "bicycling." The repository 206 may contain a statistical association between the word "bicycling" and the word "cycling"; therefore the word "cycling" is included in the additional personal ad keywords and then related to the ad 102*b*.

In addition, the user A profile 104 may include the word "physicist." The repository 206, and the additional personal ad keywords 222, may include a phrase of "Star Trek" associated with the word "physicist." The crawler 202 may have determined that there is a relationship between profiles including the word "physicist" and profiles including the phrase "Star Trek." The matcher 220 then relates the additional keywords "Star Trek" to the user B personal ad keywords 218.

In the examples described here, an exact match is identified between the phrases from the user A profile 104 and the ads 102*a-c*. In general, the profile content portions are statistically related to the personal ad keywords, but the relationship may be less than exact, such as a relationship meeting a predetermined statistical threshold. The ad server 118 outputs the related ads 102*a-c* via the interface 204. Ads can also be targeted to attributes expressed in manners other than keywords, such as user age or age range, gender, geographic proximity, and non-profile attributes such as how often a user logs into a social network.

Figure 3:
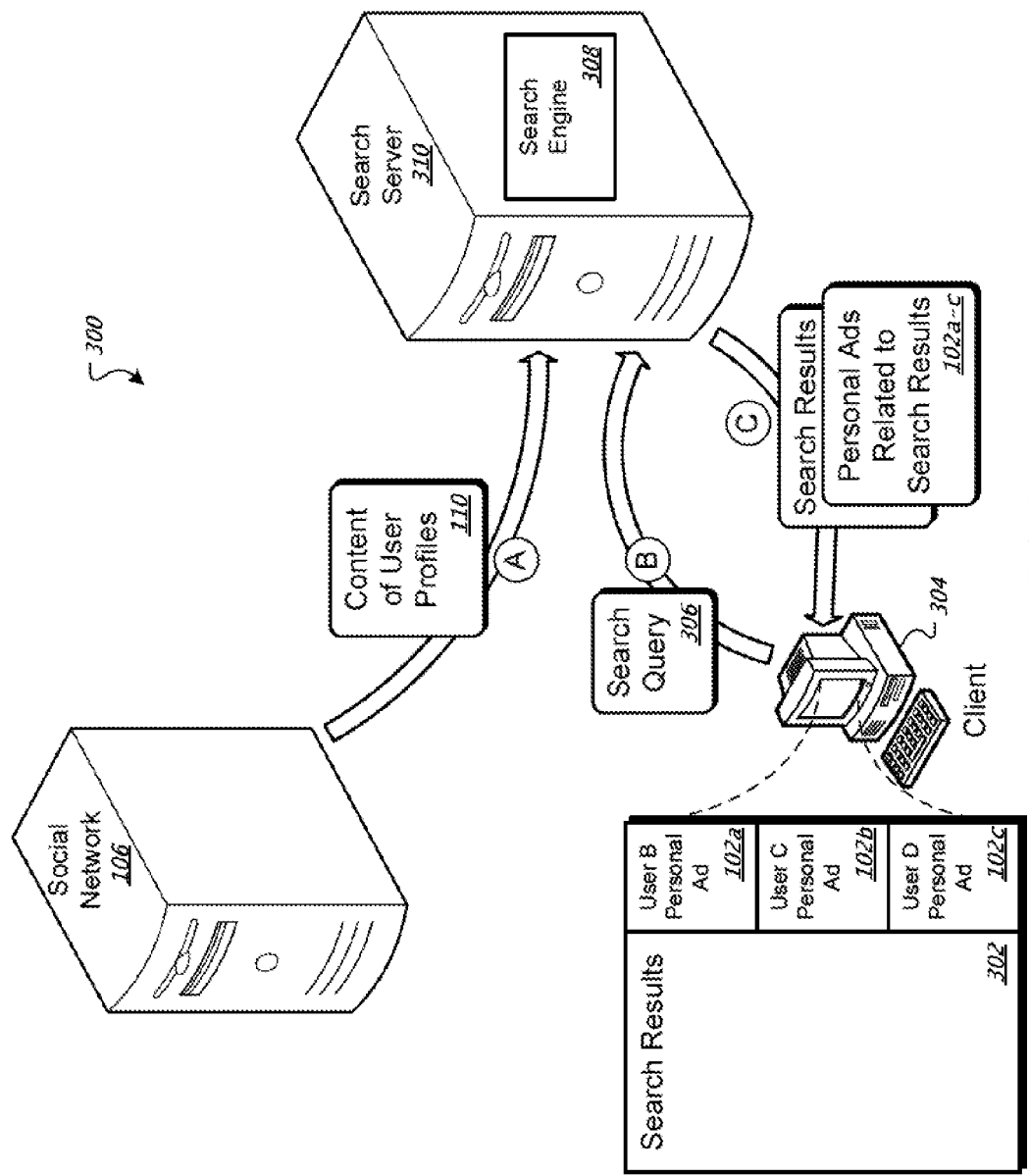
FIG. 3 is a schematic diagram of an example system for presenting advertising content related to search results.

FIG. 3 is a schematic diagram of an example system 300 for presenting advertising content 102*a-c* related to search results 302. A client 304 transmits a search query 306 to a search engine 308 at a search server 310. The search may be, for example, a lookup of profiles at the social network 106. The search engine 308 generates the search results 302. The search engine 308 may base the search results 302 on an index of the user profile content 110 from the social network as well as content from other websites. The search server 310 determines the personal ads 102*a-c* to be displayed in conjunction with the search results 302. The search server 310 then transmits the search results 302 and the personal ads 102*a-c* to the client 304.

Figure 4:
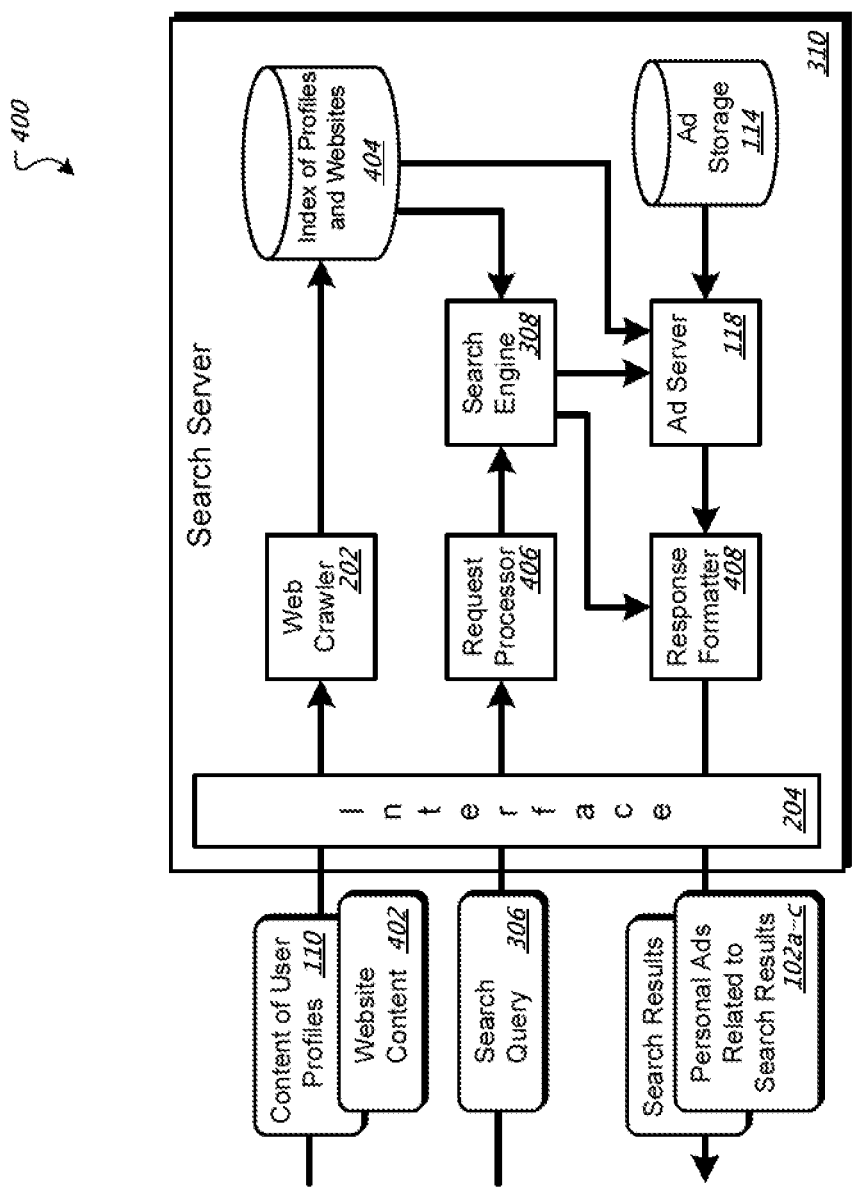
FIG. 4 is a block diagram of an example system for presenting advertising content related to search results.

FIG. 4 is a block diagram of an example system 400 for presenting advertising content 102*a-c* related to search results 302. The web crawler 202 indexes the user profile content 110 as well as other website content 402 and stores the indexed content in a repository 404. A request processor 406 receives the search query 306. After processing the search query 306, the request processor 406 passes the search query 306 to the search engine 308. The search engine 308 uses the search query 306 together with the indexed content in the repository 404 to determine the search results 302. The search engine 308 passes the search results 302 to a response formatter 408.

The ad server 118 determines which ads from the repository 114 to present with the search results 302. The ad server 118 uses the indexed content in the repository 404 together with the search query 306 and/or the search results 302 to determine the personal ads 102*a-c* related to the search results 302. The ad server 118 passes the related ads 102*a-c* to the response formatter 408. The response formatter 408 outputs the search results 302 and the related ads 102*a-c* via the interface 204.

Figure 5:
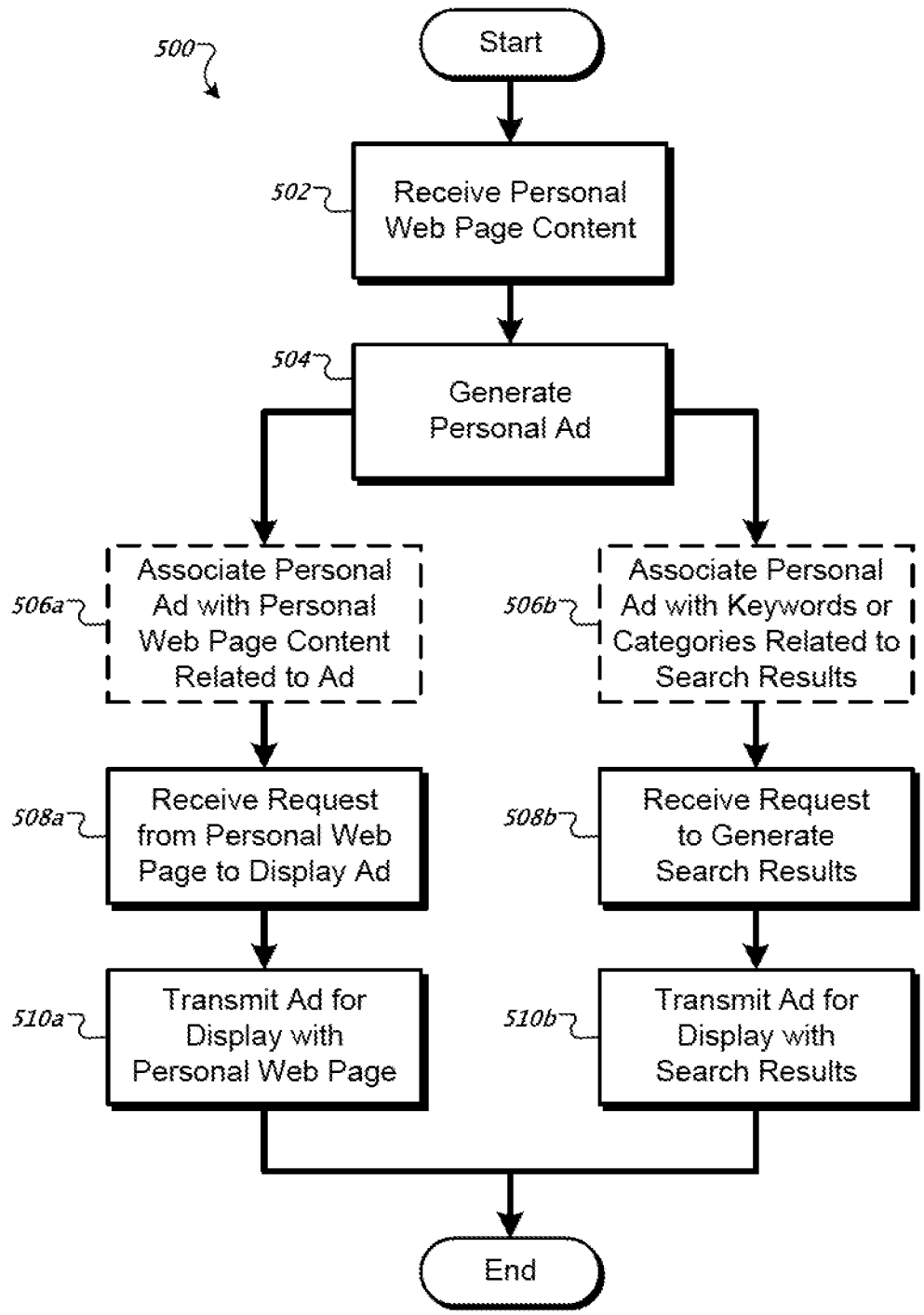
FIG. 5 is a flow chart of an example process for presenting adverting content related to a personal web page or search results.

FIG. 5 is a flow chart of an example process 500 for presenting advertising content related to a personal web page or search results. The process 500 may be performed, for example, by the systems 100, 200, 300, and/or 400, and for clarity of presentation, the description that follows uses these as the basis of examples for describing the process 500. However, another system, or combination of systems, may be used to perform the process 500.

Process 500 begins with receiving (502) personal web page content. For example, the external server 108 and the search server 310 receive the user profile content 110. The servers 108 and 310 index the user profile content 110 and store the indexed content in repositories 112 and 404, respectively.

Process 500 generates (504) one or more personal ads. For example, advertiser users may submit information used to create the personal ads 102*a-c* at the servers 108 and 310 or the ads 102*a-c* may be created by the servers 108 and 310 using content from the personal web pages referred to by the ads 102*a-c*.

Process 500 associates 506*a-b* one or more personal ads with personal web page content related to the ads or keywords/categories related to search results, respectively. For example, the ad server 118 may relate the user A profile to the personal ads 102*a-c* or the ad server 118 may relate the search results 302 to the personal ads 102*a-c*.

Process 500 receives (508*a-b*) a request to display an ad with a personal web page or to generate search results, respectively. For example, the social network 106 may make a request to the external server 108 that ads be displayed in conjunction with the user A profile 104 or the client 304 may transmit the search query 306 to the search server 310.

Process 500 transmits (510*a-b*) the one or more ads for display with the personal ad or the search results, respectively. For example, the external server 108 may transmit the personal ads 102*a-c* to the social network 106 or the search server 310 may transmit the personal ads 102*a-c* to the client 304.

The personal ads 102*a-c* may be placed in various manners. For example, the personal ads 102*a-c* may be placed on a user's profile page to which the ads 102*a-c* have been determined to bear a relation or some commonality. Various visitors to the person's profile page would then see the ads 102*a-c*. In one implementation, the ads 102*a-c* may be generated to match ads for other profiles with the present profile such as by comparing the two profiles. Specifically, an ad may be in the form of, "If you like Sally's profile, then you'll love 13 13 13 13 13 13 's profile."

The personal ads 102a-c may also be placed to be targeted to a particular member as they navigate a site such as a social network site. For example, if the user is anywhere in the site, they may see ads directed to attributes of their profile. The selected ads may be taken from a sub-group of ads relevant to the place the member is visiting, and the particular ads to display may be selected using parameters associated with the user. Also, the ad selection may occur using a combination of attributes for a visiting user, and attributes associated with a page (such as a personal profile page) that the person is visiting. In such a situation, the visitor's profile may show explicitly attributes associated with the user, whereas the place the user visits may reflect implicit attributes, such as the user's (perhaps well hidden) desires. Thus, in this manner ads 102a-c may be targeted to an end member in general.

Figure 6:
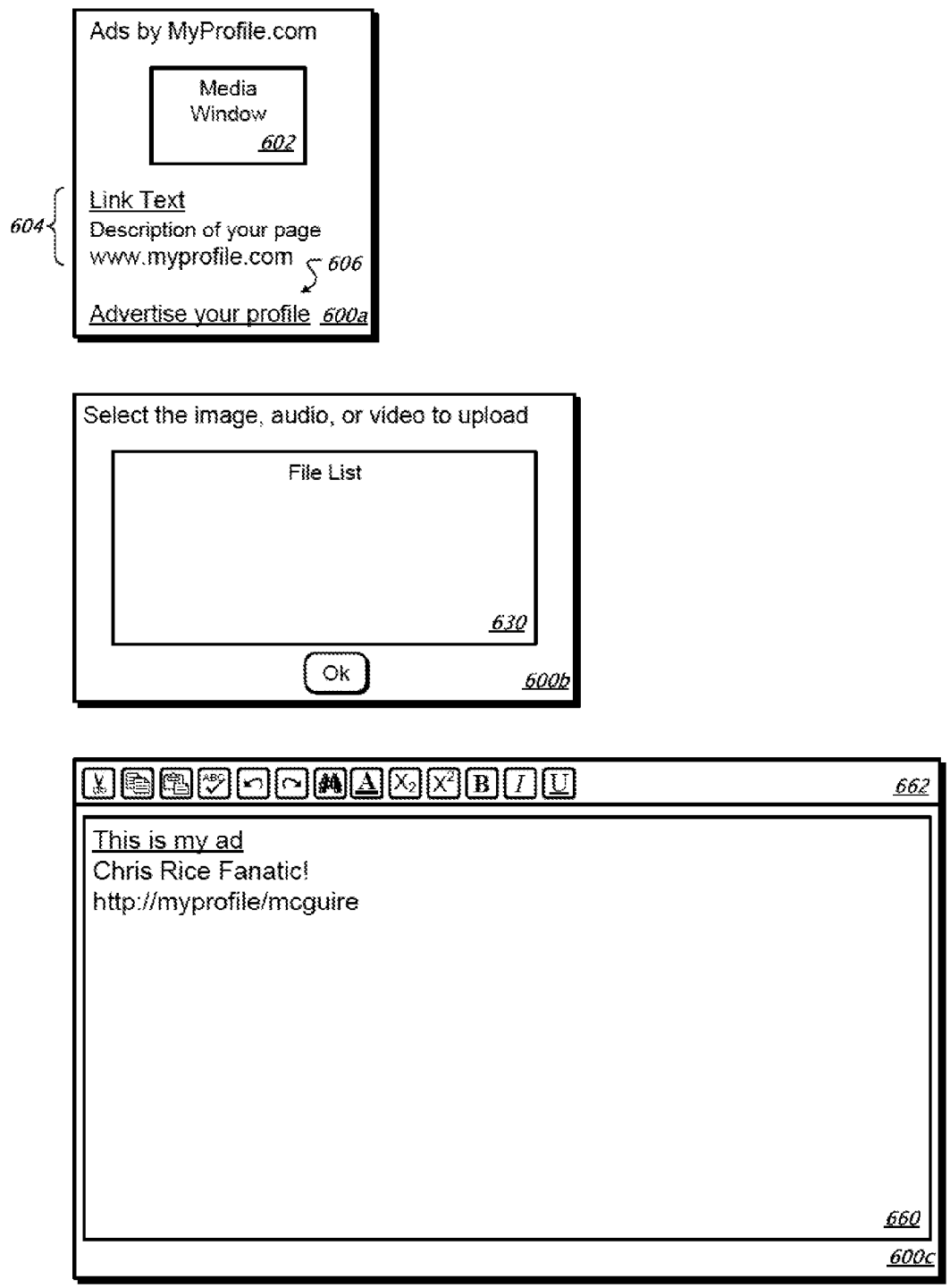
FIG. 6 shows example user interfaces for creating an advertisement to be presented in relation to a personal web page or search results.

FIG. 6 shows example user interfaces 600a-c for creating an advertisement to be presented in relation to a personal web page or search results. The interface 600a is a representation of a personal ad. The interface 600a includes a media window 602, a description text 604, and an advertise control 606. The media window 602 presents media, such as an image, audio, or video, to a user viewing and/or listening to the ad. The description text 604 contains the text body of the ad that describes a personal web page being advertised. A user viewing the ad may select the advertise control 606 to initiate the creation his or her own personal ad.

The interface 600b allows an advertiser to select a file to be uploaded from a file list 630. The file may be media such as an image, audio, or video. The file list 630 may contain controls that allow the advertiser to navigate to a location where a particular file associated with the personal web page to be advertised resides. Selecting a file in the file list 630 may initiate the interface 600c or another control may initiate the interface 600c.

The interface 600c is an editor for the text description of the personal ad. The interface 600c includes a text entry area 660 and a text formatting controls 662. An advertiser may make inputs to the text entry area 660 containing the description of the personal ad. The advertiser may format the description, such as with underlining, boldface, color, font, or font size, using the text formatting controls 662.

Figure 7:
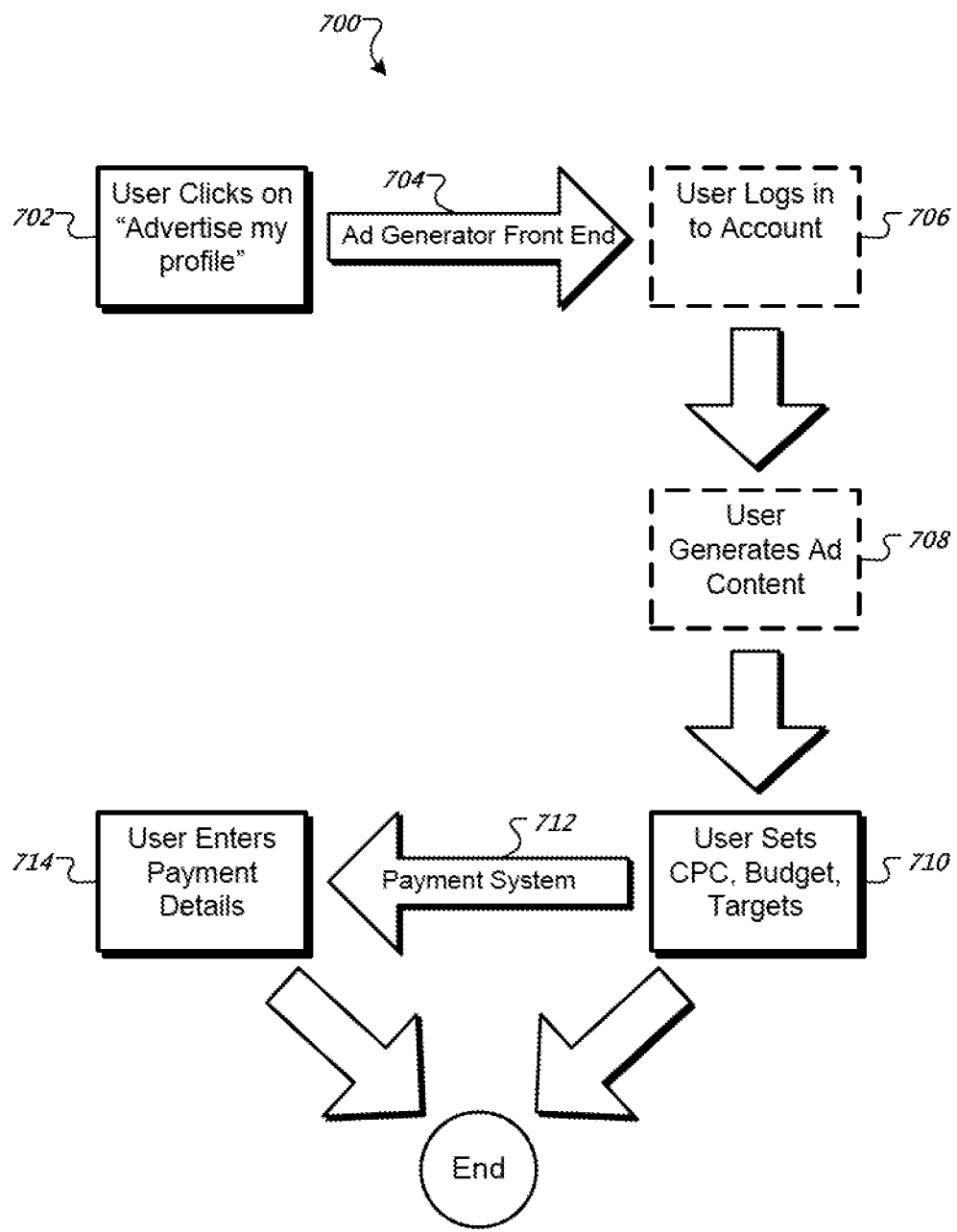
FIG. 7 is a flow chart of an example process for creating an advertisement to be presented in relation to a personal web page or search results.

FIG. 7 is a flow chart of an example process 700 for creating an advertisement to be presented in relation to a personal web page or search results. Process 700 begins with a user clicking (702) on "Advertise my profile." For example, a user may click on the advertise control 606 in the personal ad interface 600a. Selecting the advertise control 606 initiates an ad generator front end 704. The ad generator front end 704 guides the user through the personal ad creation process.

Optionally, process 700 receives (706) a user login to an account. For example, the personal ad creation/modification process may be password protected to prevent unauthorized changes from being made to personal ads.

Optionally, process 700 receives (708) a user generated ad. For example, a user may create a personal ad using the interfaces 600a-c. Alternatively, personal ads may be automatically generated by process 700 using, for example, content from a user's personal web page.

Process 700 receives (710) a user-specified cost-per-click, budget, and targets. For example, the user may specify how much the user intends to pay for each action resulting from the personal ad, such as an action of navigating to the user's personal web page via the personal ad or performing an action at the personal web page. Payments may be triggered by various events, such as cost/pay-per-impression, cost/pay-per-click, and cost/pay-per action or acquisition (where action/acquisition may include, for example, adding the user as a friend). Payments made by the advertiser based on the cost-per-click (or other method) may be credited to an entity providing the ad server 118 functionality, an entity responsible for the personal web page where the personal ad is presented, an entity hosting the personal web page where the personal ad is presented (e.g., the social network 106), or some combination of these entities.

A payment system 712 tracks the number of times the advertiser's personal web page is accessed via the personal ad. The budget indicates a limit to the number of times the personal ad may be presented and selected. The targets indicate the types of personal web pages where the personal ad is to be presented, or the types of viewers to whom it is to be presented. For example, the keywords 218 (or other attributes) may include the specified target information. The keywords 218 are then used when determining with which personal web pages to display the personal ad in conjunction.

Process 700 receives (714) user payment details. For example, the advertiser user may input credit card information or PayPal information to make the payments based on the selected cost-per-click amount.

Figure 8:
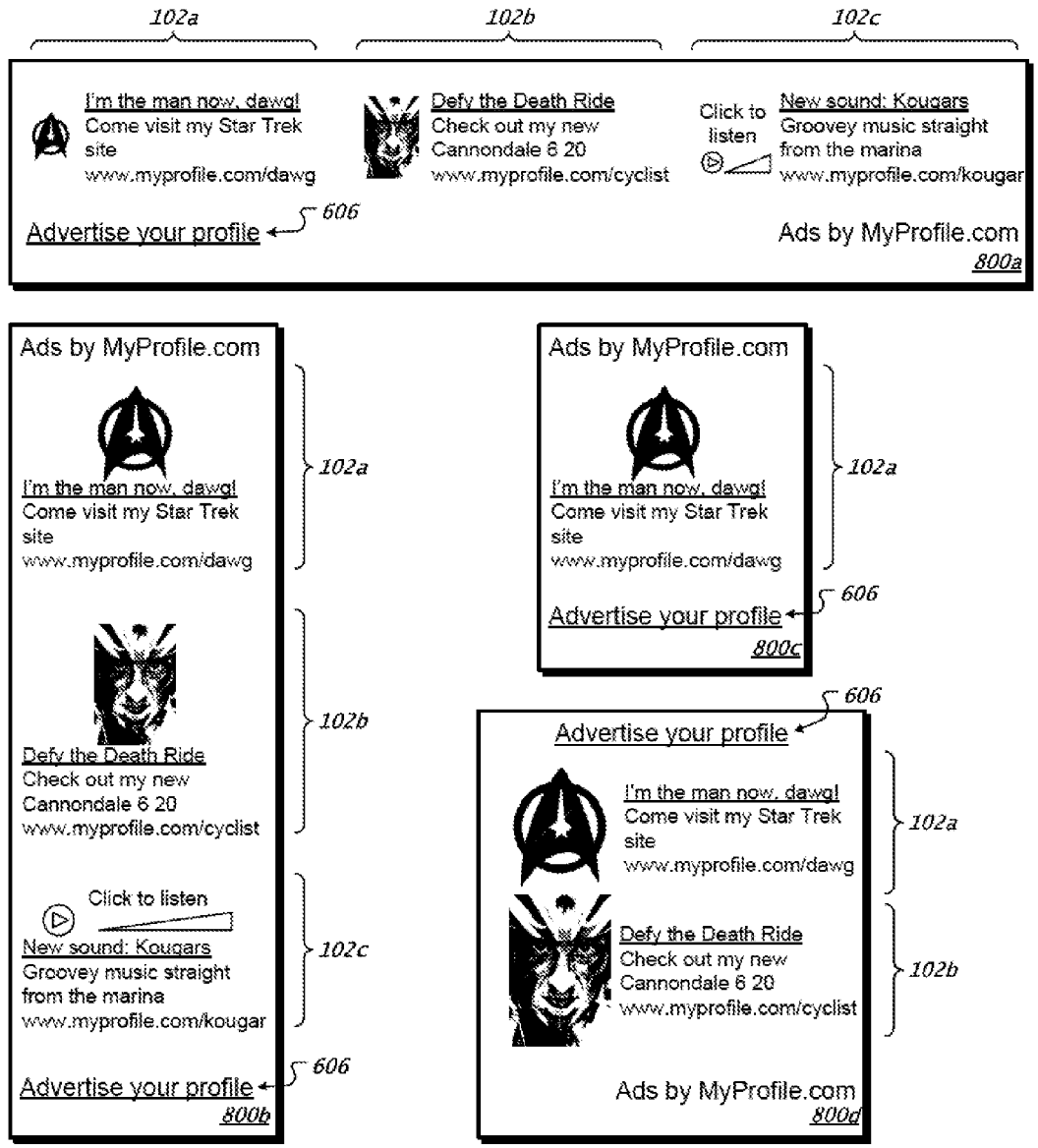
FIG. 8 shows example user interfaces for presenting advertisements related to a personal web page or search results.

FIG. 8 shows example user interfaces 800a-d for presenting advertisements related to a personal web page or search results. The interfaces 800a-d include the advertise control 606. The interfaces 800a-d present the personal ads 102a-d having the keywords "Star Trek," "cycling," and "local music," respectively. The interface 800a presents the personal ads 102a-c in a horizontal or banner orientation. The interface 800b presents the personal ads 102a-c in a vertical or sidebar orientation. The interfaces 800a-b may represent the personal ads 102a-c as described above with reference to FIGS. 1 and 3. In another example, a single personal ad may be shown, such as the personal ad 102a in the interface 800c, or two personal ads may be shown, such as the personal ads 102a-b in the interface 800d.

Figure 9:
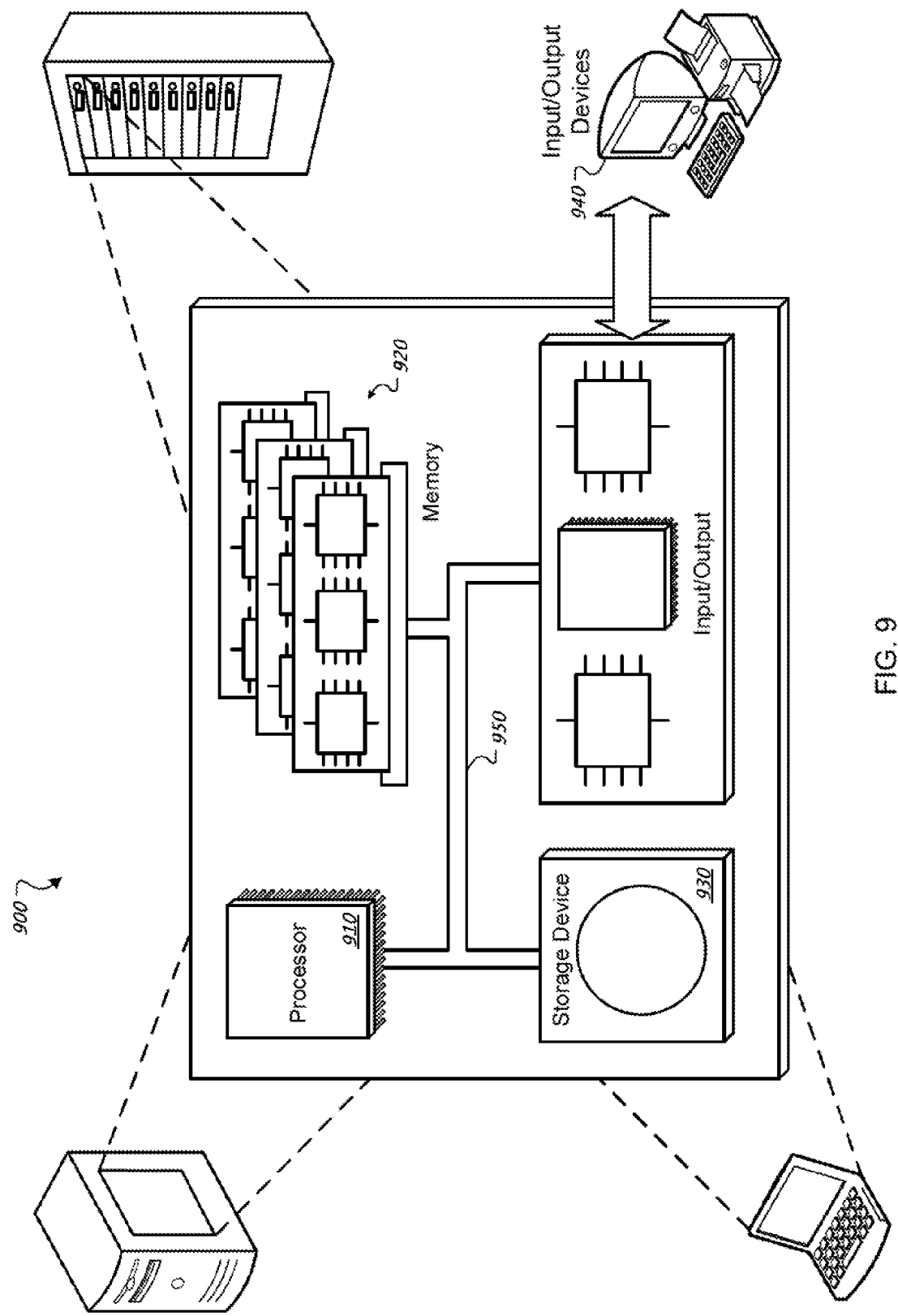
FIG. 9 is a schematic diagram of an example generic computer system.

FIG. 9 is a schematic diagram of an example of a generic computer system 900. The system 900 can be used for the operations described in association with the method 300 according to one implementation. For example, the system 900 may be included in either or all of the social network 106, the external server 108, the user B client 116, the client 304, the search server 310, and the payment system 712.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the payment system 712 described in association with FIG. 7 can include a micropayment system. In one implementation, the micropayment system can track a number of times a user selects a URL in an advertisement for a personal profile. Instead of charging a person associated with the advertisement each time the URL is selected, the micropayment system can charge the user after a charges associated with the clicks have crossed a predefined threshold, such as ten dollars. Alternatively, the micropayment system can accept a payment from a user and create an account that the fees are debited against.

In other implementations, the source of the advertisements of profiles from a first online social network may be displayed with profiles hosted by a second online social network. An external web server can receive profile information from the first online social network and transmit advertisements for profiles from the second online social network for display with profiles hosted by the first online social network.

In yet other implementations, a personal profile includes web pages not associated with a social network. These web pages may not include a standard structure of categories that describe a user. A user may design a web page that includes a variety of content include information about the user. For example, geocities.com hosts a variety of web sites that describe personal aspects of users of the web hosting service. These websites may be noncommercial websites, where the primary purpose of the content of the user designed website may be expressing personal information and interests instead of promoting a product for sale. Although advertisements for products may be generated and associated by the web hosting service for display with the user designed website, the content of the websites may still be noncommercial.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for determining personal advertisements for display with personal content in an online social network, the method comprising:

obtaining, using a computer system, personal content for a first member of an online social network, the personal content corresponding to content included in a document that characterizes the first member on the online social network;

obtaining, using the computer system, information that characterizes a personal advertisement that advertises a second member of the online social network and is stored in a repository with personal advertisements that characterize other members of the online social network, the information including information from a document that characterizes a second member of the online social network;

obtaining, using a computer system, personal content for a third member of the online social network, the personal content corresponding to content included in a document that characterizes the third member on the online social network;

comparing, using the computer system, the personal content for the first member to the information that characterizes the personal advertisement to determine whether at least a portion of the personal advertisement is related to at least a portion of the personal content for the first member, independent of determining whether the first member is related to the second member in the online social network;

comparing, using the computer system and in response to determining that at least a portion of the information that characterizes the personal advertisement is related to at least a portion of the personal content for the first member, the personal content for the third member to the information that characterizes the personal advertisement and that was determined to be related to the personal content for the first member, independent of determining whether the third member is related to the first member or the second member in the online social network; and providing, to the third member, the personal advertisement for simultaneous display with at least a portion of the document for the first member, and adjacent to the displayed at least a portion of the document for the first member, in response to determining that at least a portion of the personal content for the third member is related to the information that characterizes the personal advertisement and that was determined to be related to the personal content for the first member, the personal advertisement including a link to a document for the second member on the online social network, wherein the personal advertisement includes content that is selected to describe the second member and that differs from the content of the document for the second member.

2. The method of claim 1, wherein the personal content for the first member includes content that indicates interests of the first member, the personal advertisement includes content that indicates interests of the second member, and the personal content for the third member includes content that indicates interests of the third member.

3. The method of claim 2, wherein comparing the personal content for the first member to the information that characterizes the personal advertisement comprises determining whether at least a portion of the content that indicates interests of the first member matches at least a portion of the content that indicates interests of the second member, and wherein comparing the personal content for the third member to the information that characterizes the personal advertisement and that was determined to be related to the personal content for the first member comprises determining whether at least a portion of the content that indicates interests of the third member matches at least a portion of the content that indicates interests of the second member and that was determined to be related to the personal content for the first member.

4. The method of claim 1, wherein the second member is a group on the online social network.

5. The method of claim 1, further comprising monitoring accesses of the document for the second member on the online social network that occur as a result of the personal advertisement being presented.

6. The method of claim 5, further comprising generating a fee that is charged to the second member based on at least one of the accesses.

7. The method of claim 5, further comprising generating a payment that is paid to the first member based on at least one of the accesses.

8. The method of claim 5, further comprising generating a payment that is paid to the online social network based on at least one of the accesses.

9. A non-transitory computer-readable storage medium storing instructions that, when executed by one or more processing devices, cause the processing devices to perform operations comprising:

obtaining, using a computer system, personal content for a first member of an online social network, the personal content corresponding to content included in a document that characterizes the first member on the online social network;

obtaining, using the computer system, information that characterizes a personal advertisement that advertises a second member of the online social network and is stored in a repository with personal advertisements that characterize other members of the online social network, the information including information from a document that characterizes a second member of the online social network;

obtaining, using a computer system, personal content for a third member of the online social network, the personal content corresponding to content included in a document that characterizes the third member on the online social network;

comparing, using the computer system, the personal content for the first member to the information that characterizes the personal advertisement to determine whether at least a portion of the personal advertisement is related to at least a portion of the personal content for the first member, independent of determining whether the first member is related to the second member in the online social network;

comparing, using the computer system and in response to determining that at least a portion of the information that characterizes the personal advertisement is related to at least a portion of the personal content for the first member, the personal content for the third member to the information that characterizes the personal advertisement and that was determined to be related to the personal content for the first member, independent of determining whether the third member is related to the first member or the second member in the online social network; and providing, to the third member, the personal advertisement for simultaneous display with at least a portion of the document for the first member, and adjacent to the displayed at least a portion of the document for the first member, in response to determining that at least a portion of the personal content for the third member is related to the information that characterizes the personal advertisement and that was determined to be related to the personal content for the first member, the personal advertisement including a link to a document for the second member on the online social network, wherein the personal advertisement includes content that is selected to describe the second member and that differs from the content of the document for the second member.

10. The storage medium of claim 9, wherein the personal content for the first member includes content that indicates interests of the first member, the personal advertisement includes content that indicates interests of the second member, and the personal content for the third member includes content that indicates interests of the third member.

11. The storage medium of claim 10, wherein comparing the personal content for the first member to the information that characterizes the personal advertisement comprises determining whether at least a portion of the content that indicates interests of the first member matches at least a portion of the content that indicates interests of the second member, and wherein comparing the personal content for the third member to the information that characterizes the personal advertisement and that was determined to be related to the personal content for the first member comprises determining whether at least a portion of the content that indicates interests of the third member matches at least a portion of the content that indicates interests of the second member and that was determined to be related to the personal content for the first member.

12. The storage medium of claim 9, wherein the second member is a group on the online social network.

13. The storage medium of claim 9, wherein the operations further comprise monitoring accesses of the document for the second member on the online social network that occur as a result of the personal advertisement being presented.

14. The storage medium of claim 13, wherein the operations further comprise generating a fee that is charged to the second member based on at least one of the accesses.

15. The storage medium of claim 13, wherein the operations further comprise generating a payment that is paid to the first member based on at least one of the accesses.

16. The storage medium of claim 13, wherein the operations further comprise generating a payment that is paid to the online social network based on at least one of the accesses.

17. A computer-implemented system for providing personal advertisements for display with personal content in an online social network, the system comprising:
  one or more computer processors; and
  one or more computer-readable devices including instructions that, when executed by the one or more computer processors, implement:
    an electronic document crawler executing on a computer system to obtain personal content for a first member of an online social network and a third member of the online social network, the personal content for the first member corresponding to content included in a document for the first member on the online social network and the personal content for the third member corresponding to content included in a document for the third member on the online social network;
    a personal advertisement database to store a personal advertisement that advertises a second member of the online social network and personal advertisements that characterize other members of the online social network, the personal advertisement including a link to a document for the second member on the online social network that is selected to describe the second member and that differs from content of the document for the second member;
    a profile matcher executing on the computer system to compare the personal content for the first member to information that characterizes the personal advertisement to determine whether at least a portion of the personal advertisement is related to at least a portion of the personal content for the first member, independent of determining whether the first member is related to the second member in the online social network, and to determine whether at least a portion of the personal content for the third member is related to the information that characterizes the personal advertisement and that was determined to be related to the personal content for the first member, independent of determining whether the third member is related to the first member or the second member in the online social network; and
    an interface to provide to the third member the personal advertisement for simultaneous display with at least a portion of the document for the first member, and adjacent to the displayed at least a portion of the document for the first member, in response to determining that at least a portion of the information that characterizes the personal advertisement is related to at least a portion of the personal content for the first member and that at least a portion of the information that characterizes the personal content for the third member is related to the information that characterizes the personal advertisement and that was determined to be related to the personal content for the first member.

18. The system of claim 17, wherein the personal content for the first member includes content that indicates interests of the first member, the personal advertisement includes content that indicates interests of the second member, and the personal content for the third member includes content that indicates interests of the third member.

19. The system of claim 18, wherein the profile matcher compares the personal content for the first member to the information that characterizes the personal advertisement by determining whether at least a portion of the content that indicates interests of the first member matches at least a portion of the content that indicates interests of the second member, and wherein comparing the personal content for the third member to the information that characterizes the personal advertisement and that was determined to be related to the personal content for the first member comprises determining whether at least a portion of the content that indicates interests of the third member matches at least a portion of the content that indicates interests of the second member and that was determined to be related to the personal content for the first member.

20. The system of claim 17, wherein the interface monitors accesses of the document for the second member on the online social network that occur as a result of the personal advertisement being presented.

* * * * *